United States Patent
Barton et al.

(10) Patent No.: US 12,513,511 B2
(45) Date of Patent: Dec. 30, 2025

(54) USING 802.11v ACTION REPORT MESSAGES TO ENHANCE ROAMING

(71) Applicant: Cisco Technology, Inc., San Jose, CA (US)

(72) Inventors: Robert E. Barton, Richmond (CA); Jerome Henry, Pittsboro, NC (US); Federico Lovison, Fontanelle (IT); Indermeet Singh Gandhi, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 338 days.

(21) Appl. No.: 18/362,327

(22) Filed: Jul. 31, 2023

(65) Prior Publication Data

US 2024/0381073 A1 Nov. 14, 2024

Related U.S. Application Data

(60) Provisional application No. 63/501,714, filed on May 12, 2023.

(51) Int. Cl.
*H04W 8/26* (2009.01)
*H04W 8/08* (2009.01)

(52) U.S. Cl.
CPC ............ *H04W 8/26* (2013.01); *H04W 8/08* (2013.01)

(58) Field of Classification Search
CPC .................................. H04W 8/26; H04W 8/08
USPC ........................................................ 370/338
See application file for complete search history.

(56) References Cited

U.S. PATENT DOCUMENTS

| | | | |
|---|---|---|---|
| 2007/0258384 A1 | 11/2007 | Sammour et al. | |
| 2008/0123577 A1* | 5/2008 | Jaakkola | H04W 52/287 370/311 |
| 2010/0118830 A1 | 5/2010 | Stephenson et al. | |
| 2015/0350875 A1 | 12/2015 | Chhabra et al. | |
| 2015/0350974 A1* | 12/2015 | Patil | H04W 36/0085 370/331 |
| 2016/0073316 A1* | 3/2016 | Calcev | H04W 36/1446 370/332 |
| 2016/0302145 A1* | 10/2016 | Kasslin | H04W 48/14 |
| 2017/0019865 A1* | 1/2017 | Wang | H04W 48/14 |
| 2017/0070950 A1* | 3/2017 | Bajko | H04W 48/14 |
| 2018/0084471 A1* | 3/2018 | Emmanuel | H04W 36/38 |

(Continued)

FOREIGN PATENT DOCUMENTS

CN 113613298 A 11/2021

OTHER PUBLICATIONS

Enterprise Mobility 8.1 design Guide, Chapter 11, 802.11r, 802.11k, 802.11v, 802.11w Fast Transition Roaming, 28 pages.

(Continued)

*Primary Examiner* — Mark G. Pannell
(74) *Attorney, Agent, or Firm* — Baker Botts L.L.P.

(57) ABSTRACT

A system and method for using 802.11v action report messages to enhance roaming. In one embodiment, a method includes transmitting, to a station, a transition management message that identifies a recommended access point for roaming for the station, receiving, from the station, an action report in response to the transition management message, where the action report indicates feedback to the recommended access point identified in the transition management message, and determining a roaming recommendation based on the action report.

20 Claims, 3 Drawing Sheets

(56) References Cited

U.S. PATENT DOCUMENTS

| | | | |
|---|---|---|---|
| 2018/0184365 A1* | 6/2018 | Gidvani | H04W 48/16 |
| 2019/0007947 A1* | 1/2019 | Amini | H04L 43/0894 |
| 2020/0107224 A1* | 4/2020 | Kamath | H04W 76/15 |
| 2020/0107243 A1* | 4/2020 | Chen | H04W 40/12 |
| 2021/0045040 A1* | 2/2021 | Panje | H04W 36/38 |
| 2022/0070723 A1* | 3/2022 | Strater | H04W 84/12 |
| 2022/0116830 A1 | 4/2022 | Cariou et al. | |
| 2022/0132382 A1* | 4/2022 | Hirata | H04W 36/0038 |
| 2022/0167256 A1* | 5/2022 | Kneckt | H04W 12/108 |
| 2023/0060887 A1* | 3/2023 | Dominguez | H04W 12/50 |
| 2023/0247703 A1* | 8/2023 | Huang | H04W 76/15 |
| | | | 370/328 |
| 2024/0155717 A1* | 5/2024 | Huang | H04W 24/10 |
| 2025/0176019 A1* | 5/2025 | Beg | H04W 24/10 |
| 2025/0247182 A1* | 7/2025 | Wakudkar | H04W 72/0473 |

OTHER PUBLICATIONS

International Search Report and Written Opinion for International Application No. PCT/US2024/027011, mailed Sep. 2, 2024, 13 Pages.

\* cited by examiner

USING 802.11v ACTION REPORT MESSAGES TO ENHANCE ROAMING

RELATED APPLICATION AND CLAIM TO PRIORITY

This application claims priority to U.S. Provisional Application No. 63/501,714 filed May 12, 2023, and titled "Using 802.11v Action Report Messages to Enhance Roaming," which is incorporated herein by reference.

TECHNICAL FIELD

The present disclosure relates generally to a field of wireless communication systems and, more particularly, to using 802.11v action report messages to enhance roaming.

BACKGROUND

In wireless communication systems, an access point (AP) may provide access to external networks to various stations (STAs) with which the AP is associated. A STA may perform a "roaming" scan to find (and associate with) another AP that, for example, may offer more desirable network characteristics. Conventional approaches for facilitating roaming involve a first AP identifying a recommended second AP for roaming. However, conventional approaches for roaming can lead to recommendations to APs that do not meet a STA's service needs.

BRIEF DESCRIPTION OF THE DRAWINGS

For a more complete understanding of the present disclosure and for further features and advantages thereof, reference is now made to the following description taken in conjunction with the accompanying drawings, in which.

DESCRIPTION OF EXAMPLE EMBODIMENTS

Overview

Figure 1:
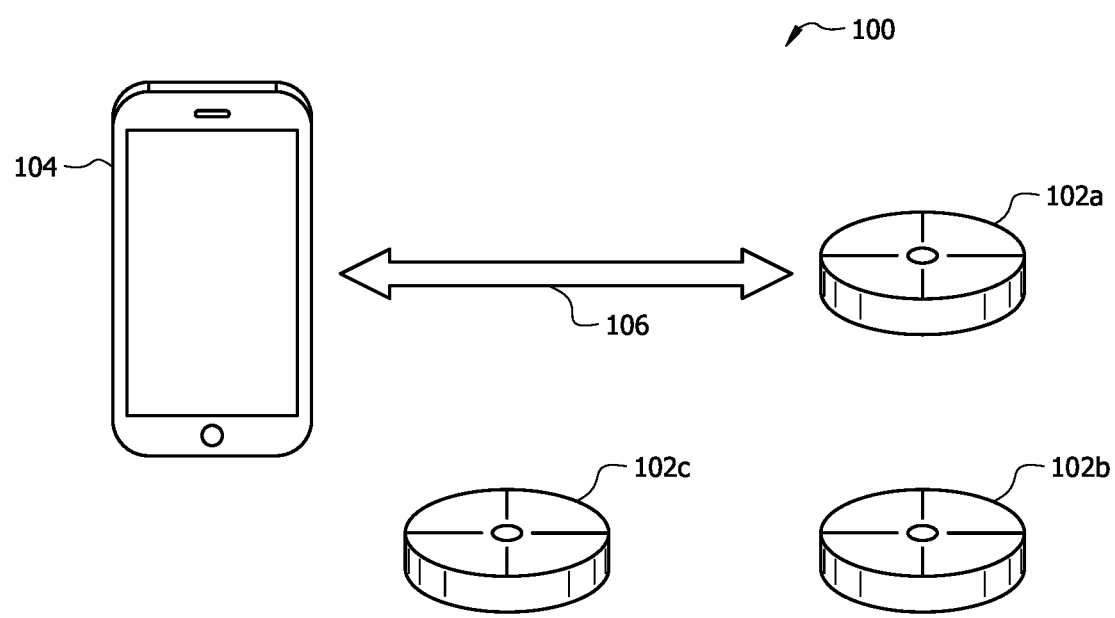
FIG. 1 illustrates an example system for using 802.11v action report messages to enhance roaming, according to some embodiments of the present disclosure.

In the 802.11 standard (i.e., the IEEE 802.11 family of standards) today, roaming is accomplished through the 11 k/v/r mechanism. 11k messages (e.g., messages configured in accordance with the 802.11k standard) are useful to a station (STA) as they provide a report of neighboring access points (APs), allowing the STA to determine an appropriate roaming option. On the other hand, 11v messages (e.g., messages configured in accordance with the 802.11v standard) are useful because they enable an AP to send messages to associated clients (i.e., STAs) advising the STA of a better AP to which the STA should roam (e.g., Network Assisted Roaming). In some cases, this is to assist with moving poorly-connected STAs to a better AP (e.g., as in the case of a sticky STA that is mobile and needs to roam, but has not roamed yet), or it may be useful for load balancing STAs across the AP infrastructure.

In either case, the AP uses 11v messages to influence the STA's actions, but it is up to the STA to decide whether it will roam or not. That is, the 11v message is not enforceable; rather, the STA uses the 11v message as a recommendation from the AP, not an imperative. How the STA accepts or rejects the recommendation in an 11v message is up to the STA; however, the reason the STA may ignore or reject the 11v recommendation is mostly unknown to the AP. In 802.11, the STA needs to respond to a basic service set (BSS) transmission management (BTM) request from an AP (e.g., an 11v message) when the STA receives such a request (e.g., a disassociation imminent message), but the reasons provided by the STA may be very limited (e.g., as shown in 802.11-2020 9-428). For example, the STA may send a responsive message that indicates that all candidates (e.g., APs to which the STA was recommend for roaming) were unsuitable or not present, which is not information that is usable by the AP to improve its messaging. In Wi-Fi Agile (WFA) Multiband (MBO), the STA can respond with better messaging, but here again, the reasons are minimal (e.g., a mere number indicating a reason category). The AP may thus issue the same 11v message to the same client over and over again, only to see it ignored—or to a series of different STAs in the same position, and be continually rejected—without any quantified knowledge as to why the STAs are rejecting the message. The AP only knows that the other APs (i.e., the APs to which the STA was recommend for roaming) were not present, or unsuitable to the STA. Certain embodiments as described herein provide a mechanism for a STA to respond to an AP's 11v roaming recommendation message in a manner that provides insight into why the 11v message's recommendation was not adopted by the STA, enabling the AP to make better roaming recommendations in the future.

According to an embodiment, a method includes transmitting, to a station, a transition management message that identifies a recommended access point for roaming for the station; receiving, from the station, an action report in response to the transition management message, where the action report indicates feedback to the recommended access point identified in the transition management message; and determining a roaming recommendation based on the action report.

In some embodiments, the method further includes deriving contextual information associated with the station. The contextual information associated with the station may include one or more of a location of the station, a time of day that the action report is received, and a radio frequency environment where the station is located. Determining a roaming recommendation based on the action report may further include determining the roaming recommendation based on the contextual information.

In some embodiments, the action report may include information indicating one or more reasons for the station to reject the recommended access point identified in the transition management message. The method may further include determining that the action report indicates a performance-related reason for the station to reject the recommended access point identified in the transition management message. In some embodiments, the method may include determining that the action report indicates a non-performance-related reason for the station to reject the recommended access point identified in the transition management message.

According to other embodiments, a system includes one or more processors and one or more computer-readable non-transitory storage media. The one or more computer-readable non-transitory storage media include instructions that, when executed by the one or more processors, cause the system to perform operations including transmitting, to a station, a transition management message that identifies a recommended access point for roaming for the station; receiving, from the station, an action report in response to the transition management message, where the action report indicates feedback to the recommended access point identified in the transition management message; and determining a roaming recommendation based on the action report.

In some embodiments, the system further includes deriving contextual information associated with the station. The contextual information associated with the station may include one or more of a location of the station, a time of day that the action report is received, and a radio frequency environment where the station is located. Determining a roaming recommendation based on the action report may further include determining the roaming recommendation based on the contextual information.

In some embodiments, the action report may include information indicating one or more reasons for the station to reject the recommended access point identified in the transition management message. The system may further include determining that the action report indicates a performance-related reason for the station to reject the recommended access point identified in the transition management message. In some embodiments, the system may include determining that the action report indicates a non-performance-related reason for the station to reject the recommended access point identified in the transition management message.

According to yet another embodiment, one or more computer-readable non-transitory storage media embody instructions that, when executed by the processor, cause the processor to perform operations including transmitting, to a station, a transition management message that identifies a recommended access point for roaming for the station; receiving, from the station, an action report in response to the transition management message, where the action report indicates feedback to the recommended access point identified in the transition management message; and determining a roaming recommendation based on the action report.

In some embodiments, the operations further include deriving contextual information associated with the station. The contextual information associated with the station may include one or more of a location of the station, a time of day that the action report is received, and a radio frequency environment where the station is located. Determining a roaming recommendation based on the action report may further include determining the roaming recommendation based on the contextual information.

In some embodiments, the action report may include information indicating one or more reasons for the station to reject the recommended access point identified in the transition management message. The operations may further include determining that the action report indicates a performance-related reason for the station to reject the recommended access point identified in the transition management message. In some embodiments, the operations may include determining that the action report indicates a non-performance-related reason for the station to reject the recommended access point identified in the transition management message.

Technical advantages of certain embodiments of this disclosure may include one or more of the following. A technical advantage of one embodiment may allow for an AP to learn reasons for a STA rejecting the AP's roaming recommendation and to update future roaming recommendations to account for the learned reasons. This may allow for more efficient and effective roaming by STAs within a wireless network. Other technical advantages will be readily apparent to one skilled in the art from the following figures, descriptions, and claims. Moreover, while specific advantages have been enumerated above, various embodiments may include all, some, or none of the enumerated advantages.

Example Embodiments

Figure 2:
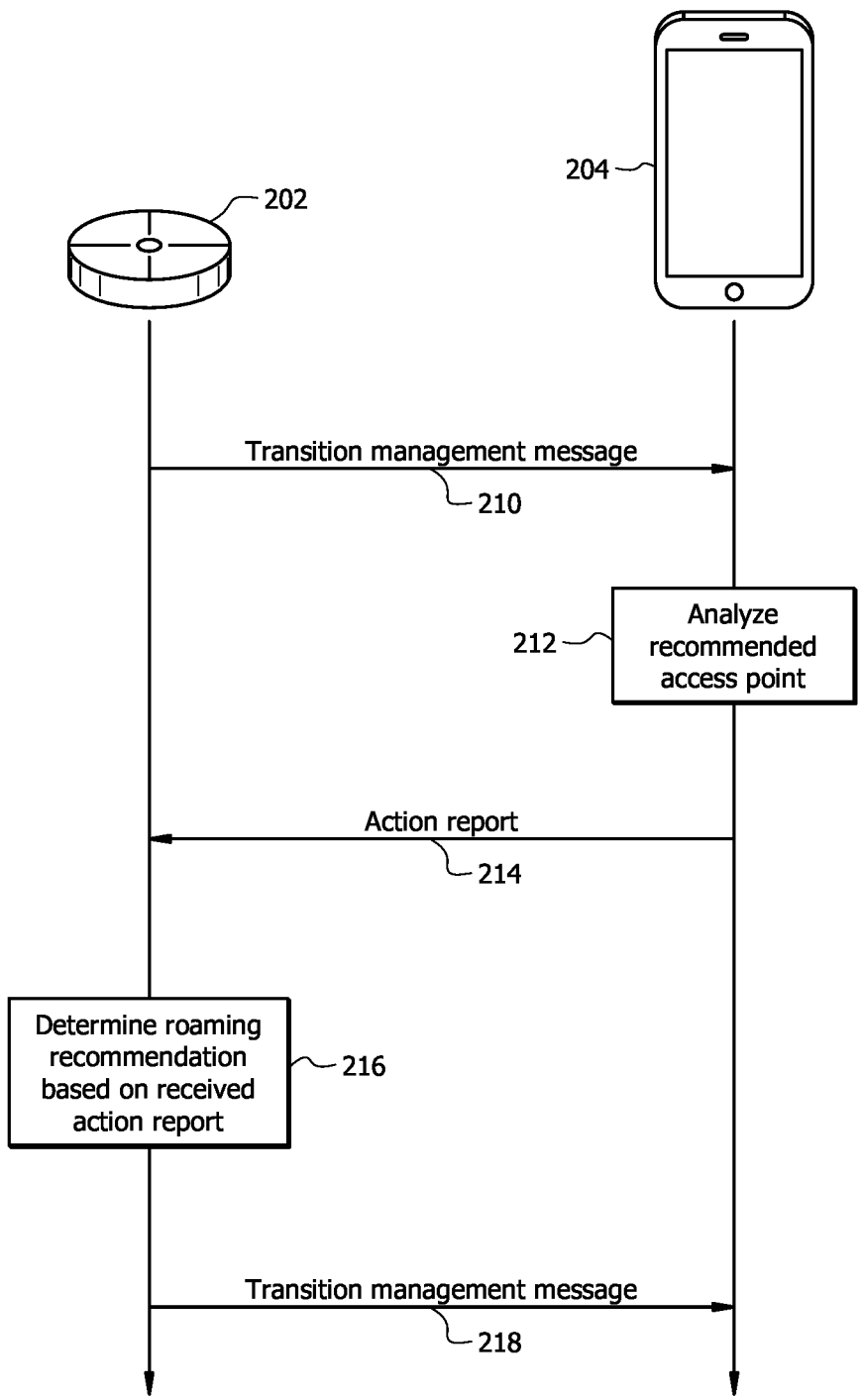
FIG. 2 illustrates an example signaling diagram for using 802.11v action report messages to enhance roaming, according to some embodiments of the present disclosure.
Figure 3:
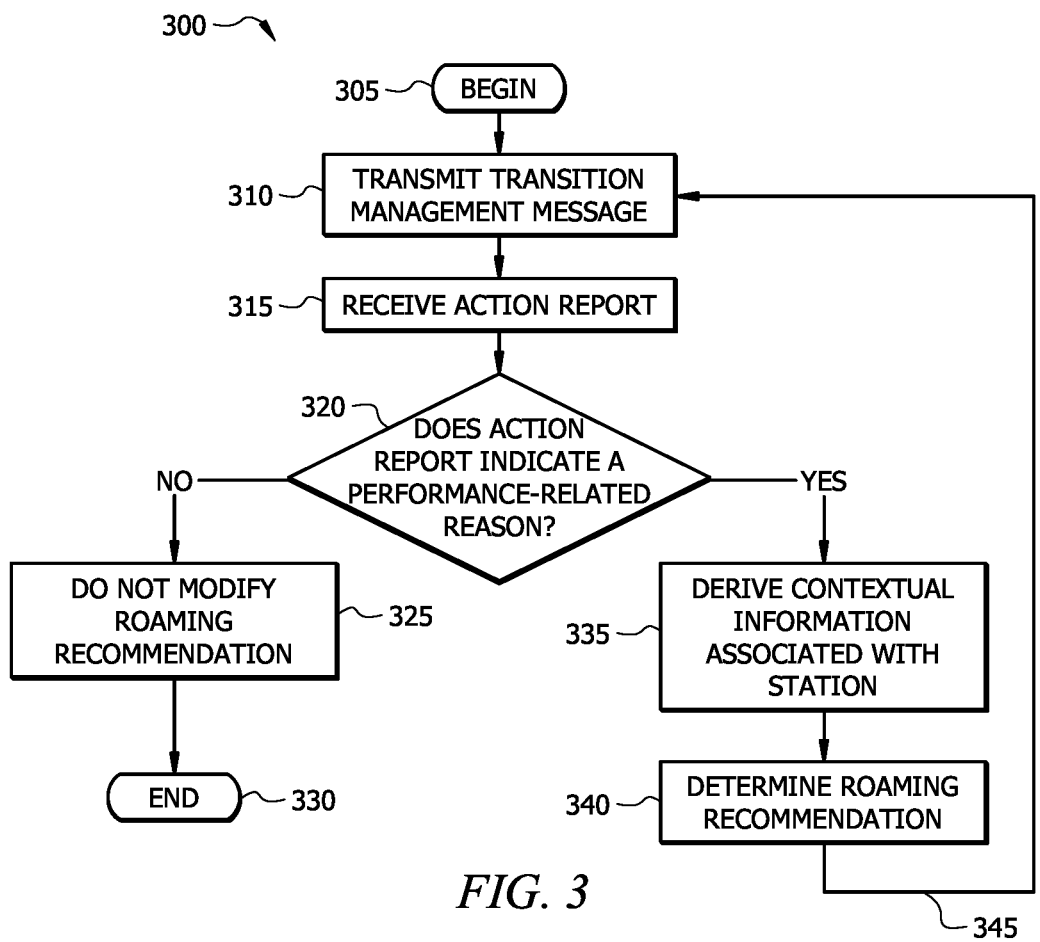
FIG. 3 illustrates an example method for using 802.11v action report messages to enhance roaming, according to some embodiments of the present disclosure.
Figure 4:
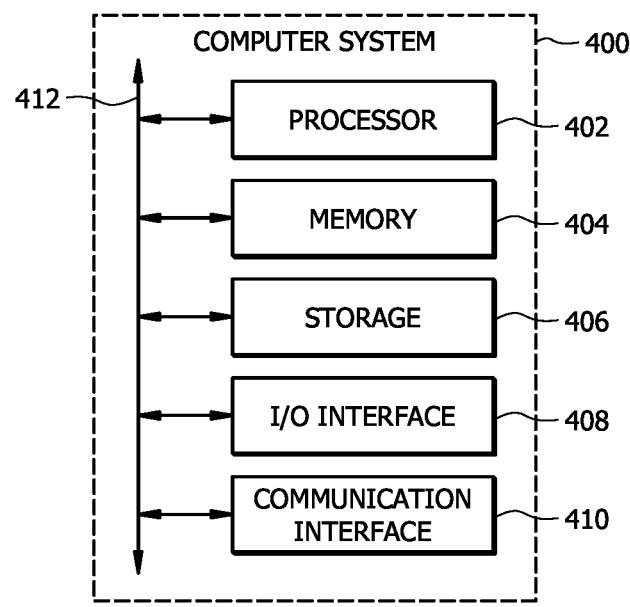
FIG. 4 illustrates an example of a computer system, according to some embodiments of the present disclosure.

This disclosure describes systems and methods for using 802.11v action report messages to enhance roaming. FIG. 1 illustrates an example system for using 802.11v action report messages to enhance roaming, in accordance with certain embodiments. FIG. 2 illustrates an example signaling diagram for using 802.11v action report messages to enhance roaming, in accordance with certain embodiments. FIG. 3 illustrates an example method for using 802.11v action report messages to enhance roaming, in accordance with certain embodiments. FIG. 4 illustrates an example of a computer system, in accordance with certain embodiments.

In existing techniques for Network Assisted Roaming, an access point (AP) may determine that a station (STA) with which the AP is associated should roam (i.e., associate with a new AP), so the AP may send a BSS Transition Management message (e.g., a 11v BSS Transition Management Request) recommending a roaming action (e.g., identifying a new AP to which the STA may associate). When the STA decides not to roam to the AP identified in the BSS Transition Management message, existing solutions teach that the STA may not send a response to the AP, or the STA may send a response to the AP that simply indicates that the STA did not find the AP identified in the BSS transition management message suitable (e.g., by using a basic classification that is not quantified). Accordingly, the AP may not be able to learn many insights about its recommendation to base future BSS Transition Management messages. This may lead to inefficiencies during roaming, as the AP continues to recommend new APs that are not suitable to the STA or to other STAs in similar circumstances. Certain embodiments as described herein improve on these conventional approaches by providing an action report from the STA that provides more detailed reasonings that quantify why the AP's roaming recommendation was not accepted. Upon receiving this action report, the AP may apply artificial intelligence (AI) and/or machine learning (ML) techniques to learn why the roaming recommendation was not accepted and modify future roaming recommendations, which may increase the likelihood that future roaming recommendations are useful to and accepted by STAs.

FIG. 1 is an illustration of an example system for using 802.11v action report messages to enhance roaming, in accordance with certain embodiments. The components of system 100 may include any suitable combination of hardware, firmware, and software. For example, the components of system 100 may use one or more elements of the computer system of FIG. 4. In the illustrated embodiment, system 100 can be a network implementing at least one of the IEEE 802.11 family of standards (such as that defined by the IEEE 802.11-2016 specification or amendments thereof including, but not limited to, 802.11ah, 802.11ad, 802.11ay, 802.11ax, 802.11az, 802.11ba, and 802.11be). System 100 may include numerous wireless communication devices such as access points (APs) 102 and stations (STAs) 104. While only one STA 104 is shown, system 100 also can include multiple STAs 104.

STA 104 also may be referred to as a mobile station (MS), a mobile device, a mobile handset, a wireless handset, an access terminal (AT), a user equipment (UE), a subscriber station (SS), or a subscriber unit, among other possibilities. STA 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated STA 104 (or set of STAs 104) may be referred to as a basic service set (BSS), which is managed by the respective AP 102. The BSS may be identified to users by a service set identifier (SSID), as well as to other devices by a basic service set identifier (BSSID), which may be a medium access control (MAC) address of the AP 102. AP 102 may periodically broadcast beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons may include an identification of a primary channel used by the respective AP 102 as well as a timing synchronization function for establishing or maintaining timing synchronization with the AP 102. The AP 102 may provide access to external networks to various STAs 104 in the WLAN via respective communication links 106.

To establish a communication link 106 with an AP 102, STA 104 may be configured to perform passive or active scanning operations ("scans") on frequency channels in one or more frequency bands (for example, the 2.4 GHz, 5.0 GHz, 6.0 GHz, or 60 GHz bands). To perform passive scanning, STA 104 may listen for beacons, which may be transmitted by respective APs 102 at a periodic time interval referred to as the target beacon transmission time (TBTT) (measured in time units (TUs) where one TU may be equal to 1024 microseconds (s)). To perform active scanning, STA 104 may generate and sequentially transmit probe requests on each channel to be scanned and then listen for probe responses from APs 102. STA 104 may be configured to identify or select an AP 102 with which to associate based on the scanning information obtained through the passive or active scans, and to perform authentication and association operations to establish a communication link 106 with the selected AP 102. The AP 102 may assign an association identifier (AID) to the STA 104 at the culmination of the association operations, which the AP 102 may use to track the STA 104. For example, AP 102a and STA 104 may communicate via communication link 106.

As a result of the increasing ubiquity of wireless networks, STA 104 may have the opportunity to select one of many BSSs within range of the STA or to select among multiple APs 102 that together form an extended service set (ESS) including multiple connected BSSs. An extended network station associated with system 100 may be connected to a wired or wireless distribution system that may allow multiple APs 102 to be connected in such an ESS. As such, a STA 104 may be covered by more than one AP 102 and can associate with different APs 102 at different times for different transmissions. Additionally, after association with an AP 102, STA 104 also may be configured to periodically scan its surroundings to find a more suitable AP 102 with which to associate. For example, STA 104 may move relative to its associated AP 102 (e.g., AP 102a) and may perform a "roaming" scan to find another AP 102 (e.g., AP 102c) having more desirable network characteristics such as a greater received signal strength indicator (RSSI) or a reduced traffic load.

In accordance with 802.11, APs 102 may generate and provide BSS transition messages to assist STAs 104 with roaming. For example, AP 102a may generate and send one or more 11k messages (i.e., messages configured in accordance with the 802.11k standard) to STA 104. An 11k message may provide a report of the neighboring APs 102 (e.g., AP 102b and AP 102c), allowing the STA 104 to determine an appropriate roaming option. As another example, AP 102a may generate and provide 11v messages (i.e., messages configured in accordance with the 802.11v standard) to STA 104, which advises STA 104 of a better AP 102 to which the STA 104 should roam (e.g., AP 102b or AP 102c). 11v messages may come in three forms: (1) Solicited request-STA 104 may send an 802.11v BSS Transition Management Query to AP 102a before roaming to subsequently receive an 11v message from AP 102a that indicates better option of AP 102 to reassociate with; (2) Unsolicited Load Balancing request-AP 102a may determine that it is heavily loaded as a result, for example, of servicing several STAs 104, so it may send out an 802.11v BSS Transition Management Request to STA 104; (3) Unsolicited Optimized Roaming request-If STA 104's RSSI and rate do not meet certain requirements, AP 102a may send out an 802.11v BSS Transition Management Request to STA 104. This procedure may be referred to, for example, as Network Assisted Roaming. In some cases, Network Assisted Roaming may assist with moving a poorly-connected STA 104 to a better AP 102 (e.g., as in the case of a "sticky" STA 104 that is mobile and needs to roam, but has not roamed yet), or it may be useful for load-balancing STAs 104 across the AP infrastructure.

In certain embodiments, AP 102a may determine that STA 104 should roam, so AP 102a may send a BSS Transition Management message (e.g., a 11v BSS Transition Management Request) recommending a roaming action (e.g., identifying a particular AP 102 to which STA 104 may connect). For example, AP 102a may transmit a first BSS Transition Management message that identifies AP 102b as a recommended AP to which STA 104 should roam. STA 104 may acknowledge receipt of the BSS Transition Management message. Because the BSS Transition Management message may be considered as advice rather than a required action, STA 104 may or may not roam to AP 102b. When STA 104 decides not to roam to the AP 102 identified in the BSS Transition Management message, existing solutions teach that STA 104 may not send a response to AP 102a, or STA 104 may send a response to AP 102a that simply indicates that STA 104 did not find the identified AP suitable (e.g., by using a very basic classification that is not quantified). Accordingly, AP 102a may not be able to learn many insights about its recommendation to base future BSS Transition Management messages.

Accordingly, in certain embodiments, when STA 104 decides not to accept the 11v advice (i.e., STA 104 decides not to roam to AP 102b identified in the BSS transition management message sent by AP 102a), STA 104 may create a detailed action report (which may be referred to as an 11v action report) and may send the action report back to AP 102*a*, thereby informing AP 102*a* why the recommendation was not accepted. The action report may include quantified information, such as information detailing radio frequency (RF) characteristics or issues observed by STA 104; a reason code, such as a reason code that indicates that the recommended AP is already connected to (i.e., associated with) a certain number of STAs (e.g., 50) that exceeds STA 104's tolerable maximum (e.g., 48); information identifying that the AP identified in the BSS transition management message (e.g., AP 102*b*) is associated with an incompatible or not-preferred vendor; information that indicates that roaming to the identified AP (e.g., AP 102*b*) would constitute a device roaming policy violation; information that identifies why STA 104 chose a different AP (e.g., AP 102*c*) for roaming instead of the AP identified in the BSS transition management message (e.g., AP 102*b*).

Upon receiving the action report from STA 104, AP 102*a* may modify future roaming recommendations based on the information included in the action report. For example, STA 104 may indicate in its action report that the AP 102 identified in AP 102*a*'s BSS transition management message (e.g., AP 102*b*) is currently associated with a certain number of STAs (e.g., 50) that exceeds STA 104's tolerable maximum (e.g., 48). Accordingly, AP 102*a* may determine that AP 102*b* is not a suitable candidate for roaming, and it may modify future recommendations based on that information. For example, AP 102*a* may subsequently send a second BSS transition management message to STA 104 (or some other STA) that identifies AP 102*c*, thereby recommending STA 104 roams to AP 102*c*. This recommendation may be based on AP 102*a*'s understanding that AP 102*b* is currently loaded beyond STA 104's tolerable maximum and is thus not a suitable roaming candidate for STA 104. AP 102*a* may apply artificial intelligence (AI) and/or machine learning (ML) techniques to modify roaming recommendations based on the detailed action reports it receives from STA 104 (and other STAs).

FIG. 2 is an illustration of an example signaling diagram for using 802.11v action report messages to enhance roaming, according to particular embodiments. The components shown in FIG. 2 may include any suitable combination of hardware, firmware, and software. For example, the components shown in FIG. 2 may use one or more elements of the computer system of FIG. 4. AP 202 and STA 204 may be associated with each other and may exchange one or more messages as shown in FIG. 2. AP 202 may correspond to AP 102*a* described above with reference to FIG. 1. STA 204 may correspond to STA 104 as described above with reference to FIG. 1.

AP 202 may determine that STA 204 should roam to a new AP. Accordingly, AP 202 may determine a new AP to which STA 204 should roam, and AP 202 may identify the new AP in transition management message 210 sent to STA 204. Transition management message 210 may be a BSS Transition Management message, such as an 11v BSS Transition Management Request. By identifying the new AP in transition management message 210, AP 202 may indicate to STA 204 that the new AP identified in transition management message 210 is the AP to which STA 204 is recommended for roaming.

At step 212, STA 204 may analyze the AP identified in transition management message 210 (i.e., the "recommended AP"). In some cases, STA 204 may determine the RF characteristics experienced by wireless communications between the recommended AP and STA 204. Examples of RF characteristics that STA 204 may determine include signal-to-noise ratio (SNR), retry rate, RSSI, RSSI slope, and data rate. For example, STA 204 may determine that the SNR of wireless communications to/from the recommended AP is 6 dB. In some cases, STA 204 may determine the number of STAs that are currently associated with the recommended AP. For example, STA 204 may determine that the recommended AP is associated with 50 other STAs when STA 204 is determining whether to roam to the recommended AP. In some embodiments, STA 204 may determine a vendor or manufacturer associated with the recommended AP. In some instances, STA 204 may determine whether roaming to the recommended AP would constitute a device roaming policy violation. In some cases, STA 204 may perform similar analyses as just described above for one or more other APs to which STA 204 may roam.

Based on its analyses of the recommended AP (i.e., the AP identified in transition management message 210) and/or the one or more other APs to which STA 204 may roam, STA 204 may determine not to roam to the recommended AP. Accordingly, STA 204 may generate and send to AP 202 action report 214, which may include quantified information that explains why STA 204 determined not to roam to the recommended AP. Action report 214 may include a first field that indicates whether STA 204 determined whether or not to roam to the recommended AP. Action report 214 may include a second field that indicates a reason why STA 204 made its decision. Action report 214 may include a third field that indicates particular measurements that support or quantify the reason indicated in the second field.

For example, STA 204 may determine not to roam to the recommended AP because one or more RF conditions experienced by wireless communications to/from the recommended AP is/are below STA 204's minimum acceptable value(s). Thus, STA 204 may generate action report 214 to indicate that STA 204 did not roam to the recommended AP (e.g., in a first field of action report 214). STA 204 may also generate action report 214 to indicate that the roaming recommendation was not followed because the RF conditions associated with the recommended AP (e.g., as determined by STA 204) are below a minimum acceptable value (e.g., in a second field of action report 214). Further, STA 204 may generate action report 214 to indicate, in a third field, for example, the RF characteristics measured by STA 204 that support STA 204's decision not to roam to the recommended AP. For example, the third field of action report 214 may indicate the SNR value measured by STA 204 (e.g., 6 dB), and/or STA 204's minimum acceptable value (e.g., 12 dB).

In some cases, STA 204 may determine not to roam to the recommended AP because the recommended AP is already associated with a number of other STAs that exceeds STA 204's tolerable maximum. Thus, STA 204 may generate action report 214 to indicate that STA 204 did not roam to the recommended AP (e.g., in a first field of action report 214). STA 204 may also generate action report 214 to indicate that the roaming recommendation was not followed because the number of other STAs to which the recommended AP is already associated exceeds STA 204's tolerable maximum (e.g., in a second field of action report 214). Further, STA 204 may generate action report 214 to indicate, in a third field, for example, the number of other STAs to which the recommended AP is already associated (e.g., 48), and/or STA 204's tolerable maximum (e.g., 48).

In some cases, STA 204 may determine not to roam to the recommended AP because the recommended AP is associated with an incompatible or not-preferred vendor or manufacturer. For example, STA 204 may require certain services or features that are supported by APs associated with particular manufacturers or vendors (e.g., the Fastlane+ service), and thus may refuse to roam to the recommended AP if the recommended AP is not associated with the particular manufacturers or vendors. Thus, STA 204 may generate action report 214 to indicate that STA 204 did not roam to the recommended AP (e.g., in a first field of action report 214). STA 204 may generate action report 214 to indicate that the roaming recommendation was not followed because the recommended AP is associated with an incompatible or not-preferred vendor or manufacturer (e.g., in a second field of action report 214). Further, STA 204 may generate action report 214 to indicate, in a third field, for example, the identity of the manufacturer or vendor associated with the recommended AP. Similarly, STA 204 may generate action report 214 to indicate a service or feature that is not supported by the recommended AP (e.g., in the third field of action report 214 or in a fourth field of action report 214).

In some embodiments, STA 204 may determine not to roam to the recommended AP because roaming to the recommended AP would constitute a device roaming policy violation. Thus, STA 204 may generate action report 214 to indicate that STA 204 did not roam to the recommended AP (e.g., in a first field of action report 214). STA 204 may generate action report 214 to indicate that the roaming recommendation was not followed because roaming to the recommended AP would constitute a device roaming policy violation (e.g., in a second field of action report 214). Further, STA 204 may generate action report 214 to indicate, in a third field, for example, the roaming policy that would be violated if STA 204 roamed to the recommended AP.

In some instances, STA 204 may determine not to roam to the recommended AP because another AP is a better option for roaming. For example, STA 204 may determine that another AP is associated with better RF characteristics than the recommended AP, so STA 204 may determine to roam to the other AP rather than the recommended AP. Thus, STA 204 may generate action report 214 to indicate that STA 204 did not roam to the recommended AP (e.g., in a first field of action report 214). STA 204 may generate action report 214 to indicate that the roaming recommendation was not followed because STA 204 chose a different AP for roaming (e.g., in a second field of action report 214). Further, STA 204 may generate action report 214 to indicate, in a third field, for example, the identity of the AP which STA 204 chose to roam, and/or to indicate the RF characteristics associated with the other chosen AP, and/or to indicate the RF characteristics associated with the recommended AP (e.g., as measured by STA 204).

If STA 204 determines to follow AP 202's recommendation and roam to the recommended AP (i.e., the AP identified in transition management message 210), STA 204 may generate action report 214 to indicate that the roaming recommendation was accepted by STA 204. Action report 214 may also include (in one or more fields) information that indicates why the roaming recommendation was followed by STA 204. For example, STA 204 may include information that indicates the RF characteristics associated with the recommended AP and the RF characteristics associated with other APs to which STA 204 could have roamed. Action report 214 may be included in one or more BSS Transition Management message(s), such as one or more 11v message(s), or it may be implemented as an extension to one or more BSS Transition Management message(s). For example, action report 214 may be implemented as one or more supplemental fields to existing BSS Transition Management messages as described above.

Upon receiving action report 214 from STA 204, AP 202 may determine a new roaming recommendation based on the information received in action report 214 (step 216). Accordingly, AP 202 may adjust an algorithm, process, or training data used to recommended APs for roaming. Based on the feedback received in action report 214, as well as subsequent action reports, AP 202 may be able to learn why roaming recommendations are accepted or rejected. Accordingly, AP 202 may be able to continue providing certain recommendations, or AP 202 may be able to provide alternate roaming recommendations that were previously not being made due to the feedback received in the action reports. For example, AP 202 may learn to recommend a second recommended AP that is associated with RF characteristics whose values are greater than STA 204's minimum acceptable threshold. In some cases, AP 202 may learn to recommend a second recommended AP that is currently associated with a number of other STAs that does not exceed STA 204's tolerable maximum. In some instances, AP 202 may learn to recommend a second recommended AP that is not associated with an incompatible or not-preferred vendor or manufacturer of STA 204. In some instances, AP 202 may learn to recommend a second recommended AP that would not constitute a roaming policy violation for STA 204. AP 202 may apply AI and/or ML techniques to modify its future roaming recommendations.

After modifying its roaming recommendations based on action report 214, AP 202 may generate and send to STA 204 (or other STA) second transition management message 218 that identifies a second recommended AP to which STA 204 (or the other STA) may roam. Because AP 202 generates second transition management message 218 based on the information received in action report 214, the second recommended AP should have an increased likelihood of being an acceptable roaming destination for STA 204 (or other STA).

FIG. 3 illustrates an example method or using 802.11v action report messages to enhance roaming, according to some embodiments of the present disclosure. Method 300 begins at step 305. At step 310, AP 102a may transmit a transition management message to STA 104. The transition management message may identify a recommended AP 102 (e.g., AP 102b) for roaming for STA 104. As discussed in more detail with reference to FIG. 2 above, STA 104 may analyze the recommended AP (e.g., AP 102b) and one or more other APs (e.g., AP 102c) and determine whether or not it will roam to the recommended AP. As discussed in more detail with reference to FIG. 2, STA 104 may generate an action report that details its reasons for roaming or not roaming to the recommended AP. At step 315, AP 102a may receive the action report from STA 104.

At step 320, AP 102a may determine whether the received action report indicates a performance-related reason for STA 104 rejecting the roaming recommendation (i.e., not roaming to the recommended AP). Examples of performance-related reasons for rejecting the roaming recommendation are described with reference to FIG. 2 (e.g., the recommended AP being associated with RF characteristics that fall below STA 104's minimum acceptable values, or the recommended AP being associated with a number of other STAs that exceeds STA 104's tolerable maximum). Examples of non-performance-related reasons for rejecting the roaming recommendation include STA 104's decision to use a cellular network for wireless communications.

If the received action report indicates a non-performance-related reason for STA 104 rejecting the roaming recommendation, then, at step 325, AP 102*a* may determine that the non-performance related reason is not relevant for modifying future roaming recommendations, so AP 102*a* may not modify its future roaming recommendations based on this information. After AP 102*a* makes such a determination, method 300 ends.

If AP 102*a* determines that the received action report indicates a performance-related reason for STA 104 rejecting the roaming recommendation, at step 335 AP 102*a* may derive contextual information associated with STA 104. Examples of contextual information include the location of STA 104, RF characteristics (e.g., the RSSI, data rate, SNR, and retry rate) associated with STA 104, the time of day the action report is received from STA 104, and the date and/or season the action report is received from STA 104. RF characteristics associated with the STA 104 may indicate the RF environment in which STA 104 is located.

At step 340, AP 102*a* may determine a subsequent roaming recommendation based on the information received in the action report from STA 104 and/or the contextual information derived for STA 104. As discussed above with reference to FIG. 2, STA 104 may determine the subsequent roaming recommendation to recommend a second AP 102 that better aligns with the requirements and/or preferences of STA 104, which may be indicated in the received action report. Further, AP 102*a* may use the derived contextual information of STA 104 to modify the subsequent roaming recommendation. That is, AP 102*a* may determine that its original recommendation (i.e., the AP identified in the transition management message sent to STA 104) is not suitable for STA 104 or other STAs located in the same or similar location at STA 104, that its original recommendation is not suitable for STAs associated with the same or similar RF characteristics as STA 104, or that its original recommendation is not suitable at certain times of day (e.g., the time of day when the action report is received from STA 104) or times of year (e.g., the time of year or general season when the action report is received from STA 104). For example, based on the action report from STA 104 as well as the derived contextual information of STA 104, AP 102*a* may learn that the recommended AP (e.g., AP 102*b*) is overloaded around 8:00 AM on Monday. Accordingly, AP 102*a* may modify future roaming recommendations such that AP 102*b* is not identified as a recommended roaming option for STA 104 or other STAs roaming in a similar location at 8:00 AM on Mondays. Similarly, if the received action report includes information identifying some other AP 102 (e.g., AP 102*b*) as STA 104's choice for roaming, AP 102*a* may modify future roaming recommendations to more heavily favor the other AP 102 (or APs with similar characteristics as the other AP 102) as its roaming recommendation for STA 104 or other STAs facing similar circumstances as STA 104 (e.g., as indicated by the derived contextual information for STA 104).

Upon determining the modified roaming recommendation based on the received action report and/or the derived contextual information, AP 102*a*, at step 345, may transmit a second transition management message identifying an AP to which STA 104 (or other STA) may roam. Method 300 may thus continue, and as time progresses patterns may emerge, allowing AP 102*a* to learn why roaming recommendations are rejected in various places or under various circumstances in a network. Over time, AP 102*a* may be able to provide alternate roaming recommendations that were previously not being made thanks to the action reports received by STAs. As time progresses and AP 102*a* learns from the received action reports and derived contextual information, AP 102*a* may provide better roaming guidance to STAs.

Although this disclosure describes and illustrates particular steps of method 300 of FIG. 3 as occurring in a particular order, this disclosure contemplates any suitable steps of method 300 of FIG. 3 occurring in any suitable order. Although this disclosure describes and illustrates an example method for using 802.11v action report messages to enhance roaming, including the particular steps of method 300 of FIG. 3, this disclosure contemplates any suitable method for using 802.11v action report messages to enhance roaming, including any suitable steps, which may include all, some, or none of the steps of method 300 of FIG. 3, where appropriate. Although FIG. 3 describes and illustrates particular components, devices, or systems carrying out particular actions, this disclosure contemplates any suitable combination of any suitable components, devices, or systems carrying out any suitable actions.

FIG. 4 illustrates an example of a computer system, in accordance with certain embodiments. In particular embodiments, one or more computer systems 400 provide functionality described or illustrated herein. As an example, one or more computer systems 400 may be used to provide at least a portion of APs 102 or STA 104 described with respect to FIG. 1. As yet another example, one or more computer systems 400 may be used to perform one or more steps described with respect to FIG. 2 and FIG. 3. In particular embodiments, software running on one or more computer systems 400 provides functionality described or illustrated herein or performs one or more steps of one or more methods described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example, and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein.

Modifications, additions, or omissions may be made to the elements shown in the figure above. The components of a device may be integrated or separated. Moreover, the functionality of a device may be performed by more, fewer, or other components. The components within a device may be communicatively coupled in any suitable manner. Functionality described herein may be performed by one device or distributed across multiple devices. In general, systems and/or components described in this disclosure as performing certain functionality may comprise non-transitory computer readable memory storing instructions and processing circuitry operable to execute the instructions to cause the system/component to perform the described functionality.

While several embodiments have been provided in the present disclosure, it should be understood that the disclosed systems and methods might be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry configured to execute program code stored in memory. The term unit may have conventional meaning in the field of electronics, electrical devices and/or electronic devices and may include, for example, electrical and/or electronic circuitry, devices, modules, processors, receivers, transmitters, memories, logic solid state and/or discrete devices, computer programs or instructions for carrying out respective tasks, procedures, computations, outputs, and/or displaying functions, and so on, as such as those that are described herein.

What is claimed is:

1. A method, comprising:
transmitting, to a station, a transition management message that identifies a recommended access point for roaming for the station;
receiving, from the station, an action report in response to the transition management message, wherein the action report indicates feedback to the recommended access point identified in the transition management message; and
determining a roaming recommendation based on the action report.

2. The method of claim 1, further comprising:
deriving contextual information associated with the station.

3. The method of claim 2, wherein contextual information associated with the station comprises one or more of a location of the station, a time of day that the action report is received, and a radio frequency environment where the station is located.

4. The method of claim 2, wherein determining a roaming recommendation based on the action report further comprises determining the roaming recommendation based on the contextual information.

5. The method of claim 1, wherein the action report comprises information indicating one or more reasons for the station to reject the recommended access point identified in the transition management message.

6. The method of claim 5, further comprising:
determining that the action report indicates a performance-related reason for the station to reject the recommended access point identified in the transition management message.

7. The method of claim 5, further comprising:
determining that the action report indicates a non-performance-related reason for the station to reject the recommended access point identified in the transition management message.

8. A system, comprising:
one or more processors; and
one or more computer-readable non-transitory storage media comprising instructions that, when executed by the one or more processors, cause one or more components of the system to perform operations comprising:
transmitting, to a station, a transition management message that identifies a recommended access point for roaming for the station;
receiving, from the station, an action report in response to the transition management message, wherein the action report indicates feedback to the recommended access point identified in the transition management message; and
determining a roaming recommendation based on the action report.

9. The system of claim 8, further comprising:
deriving contextual information associated with the station.

10. The system of claim 9, wherein contextual information associated the station comprises one or more of a location of the station, a time of day that the action report is received, and a radio frequency environment where the station is located.

11. The system of claim 9, wherein determining a roaming recommendation based on the action report further comprises determining the roaming recommendation based on the contextual information.

12. The system of claim 8, wherein the action report comprises information indicating one or more reasons for the station to reject the recommended access point identified in the transition management message.

13. The system of claim 8, further comprising:
determining that the action report indicates a performance-related reason for the station to reject the recommended access point identified in the transition management message.

14. The system of claim 8, the operations further comprising:
determining that the action report indicates a non-performance-related reason for the station to reject the recommended access point identified in the transition management message.

15. One or more computer-readable non-transitory storage media embodying instructions that, when executed by a processor, cause performance of operations comprising:
transmitting, to a station, a transition management message that identifies a recommended access point for roaming for the station;
receiving, from the station, an action report in response to the transition management message, wherein the action report indicates feedback to the recommended access point identified in the transition management message; and
determining a roaming recommendation based on the action report.

16. The one or more computer-readable non-transitory storage media of claim 15, the operations further comprising:
deriving contextual information associated with the station.

17. The one or more computer-readable non-transitory storage media of claim 16, wherein contextual information associated the station comprises one or more of a location of the station, a time of day that the action report is received, and a radio frequency environment where the station is located.

18. The one or more computer-readable non-transitory storage media of claim 16, wherein determining a roaming recommendation based on the action report further comprises determining the roaming recommendation based on the contextual information.

19. The one or more computer-readable non-transitory storage media of claim 15, wherein the action report comprises information indicating one or more reasons for the station to reject the recommended access point identified in the transition management message.

20. The one or more computer-readable non-transitory storage media of claim 15, the operations further comprising:
determining that the action report indicates a performance-related reason for the station to reject the recommended access point identified in the transition management message.

* * * * *